United States Patent [19]

Alexander et al.

[11] Patent Number: 4,552,335

[45] Date of Patent: Nov. 12, 1985

[54] BALL VALVE

[75] Inventors: William H. Alexander; Roy R. Dare, both of Houston, Tex.

[73] Assignee: Vapor Corporation, Chicago, Ill.

[21] Appl. No.: 548,320

[22] Filed: Nov. 3, 1983
(Under 37 CFR 1.47)

[51] Int. Cl.[4] .............................. F16K 5/06
[52] U.S. Cl. .................... 251/315; 251/317; 251/363
[58] Field of Search ............ 251/315, 316, 317, 363, 251/364; 137/385; 277/165

[56] References Cited

U.S. PATENT DOCUMENTS

| | | | |
|---|---|---|---|
| 3,297,298 | 1/1967 | Sachnik | 251/316 |
| 3,331,582 | 7/1967 | Ford | 251/317 |
| 3,357,679 | 12/1967 | Gulick | 251/317 |
| 3,408,038 | 10/1968 | Scaramucci | 251/317 |
| 3,455,534 | 7/1969 | Scaramucci | 251/315 |
| 3,497,178 | 2/1970 | Priese | 251/315 |
| 3,540,693 | 11/1970 | Wise | 251/315 |
| 3,610,575 | 10/1971 | Yoneda | 251/315 |
| 3,865,130 | 2/1975 | Mullis | 137/385 |
| 4,157,723 | 6/1979 | Granzow et al. | 141/1 |
| 4,411,407 | 10/1983 | Ninomiya et al. | 251/315 |

Primary Examiner—Martin P. Schwadron
Assistant Examiner—James R. Shay
Attorney, Agent, or Firm—Francis J. Lidd

[57] ABSTRACT

A high pressure ball valve including a valve body with inlet and outlet ports, a ball having a passageway therethrough disposed between the ports, and seats between the ball and the ports guidably supporting the ball. Each seat includes a core of polyethersulphone having a ball engaging face with the same radius as the ball, a metal reinforcing ring, and elastomeric seals bonded to the ball engaging face and the face that seats in the valve body.

11 Claims, 6 Drawing Figures

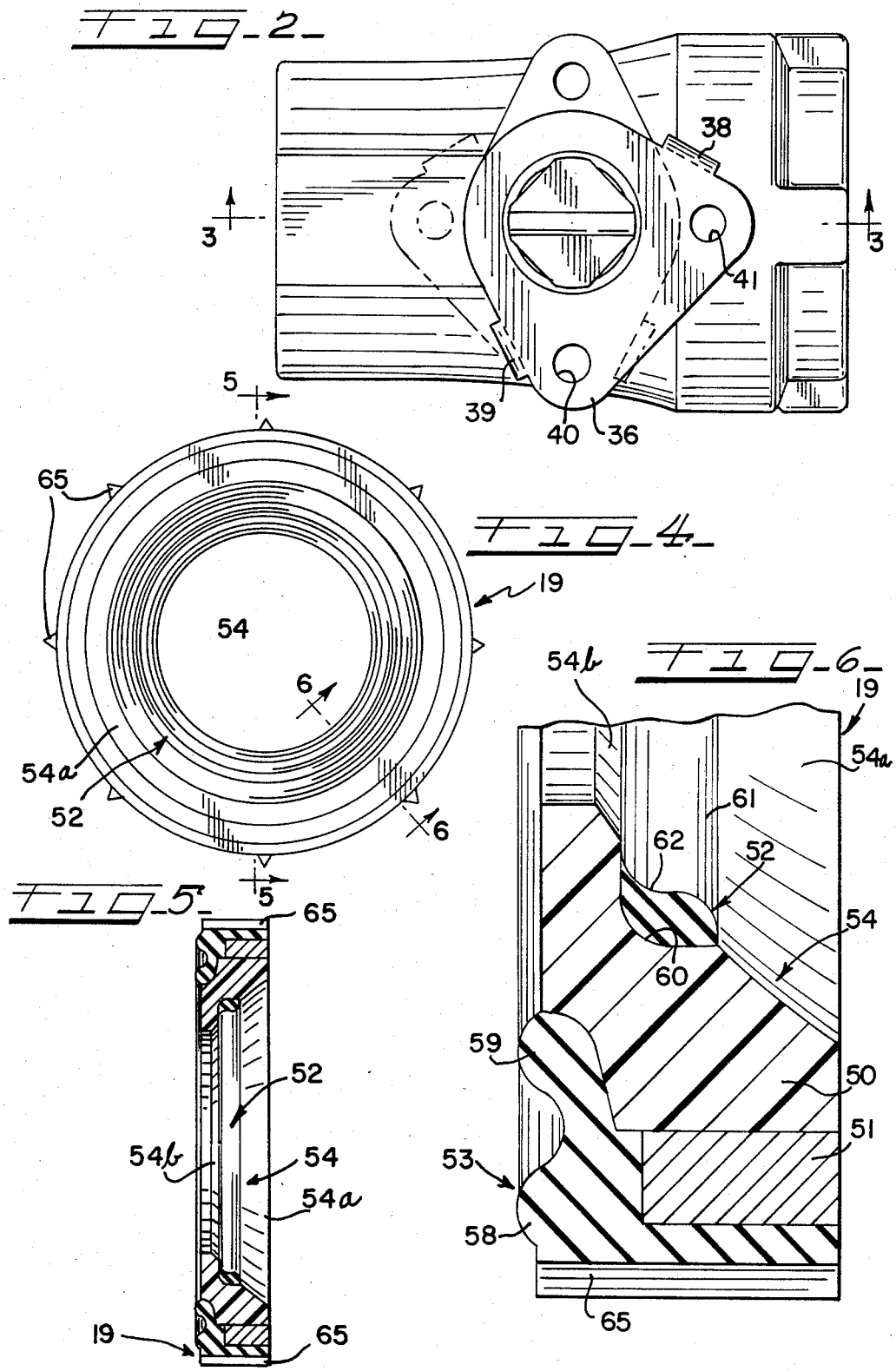

BALL VALVE

DESCRIPTION

This invention relates in general to a high pressure ball valve for oil field service to control the flow of water, oil or gas through a pipeline, and more particularly to a new and improved seat for the ball closure element of the valve, and still more particularly to a seat having elastomeric seal elements bonded to a molded core of polyethersulphone.

Heretofore, it has been well known to provide ball valves for controlling the flow of high pressure water, oil and gas in pipelines used in oil field service. Such valves have utilized many different seat structures that generally include a molded plastic core onto which is bonded one or more elastomeric seals at a temperature of about 300 degrees F. The high temperature bonding eliminates most thermoplastics. For example, it has been known to provide a seat having a thermosetting epoxy resin core to which elastomeric seals are bonded. While such epoxy cores have seemingly withstood the high temperature elastomeric bonding required for bonding Buna-N, neoprene, nitrile, or the like elastomeric material which best provides the desired sealing characteristics, the design of the seal disclosed requires a plastic core material having greater inherent strength and a plastic deformation point (temperature) in excess of 400 degrees F.

Another problem encountered is that the seals must withstand the high stresses of opening and closing. Pressures up to 2000 pounds per inch may be generated in oil field service pipelines. Cracking a valve will develop hypersonic flow across the valve so it must withstand "blowout" on opening and closing operation.

It has also been known to provide valves with nylon and Teflon seats. Teflon seats must be machined or sintered, which is quite expensive. Moreover, they do not seal well at low pressures.

The high pressure ball valve of the present invention overcomes the difficulties heretofore encountered particularly with respect to providing a ball valve with a satisfactory seat structure that can withstand the high pressures of oil field pipelines. It is preferable to have the ability to make the seat by molding the core. The seat of the present invention utilizes a thermoplastic material which has a high melting point such that it can easily withstand the bonding of elastomeric seals without degradation. The core of the seat according to the invention is molded of polyethersulphone, a thermoplastic material that can stand up to about 400 degrees F. heat without distorting. It does not soften until it reaches about 438 degrees F. Thus, it can easily stand the 300 degrees F. elastomeric bonding temperatures. Preferably, the seat core of the present invention is made of glass filled polethersulphone which provides the best possible strength characteristic. A metal reinforcing ring is concentrically arranged to the core and elastomerically bonded to the core during the formation of the rear seal. A face seal is elastomerically bonded to the core, and it will be appreciated that the two seals coact to seal between the ball closure element and the valve body when the closure element is in closed position.

It is therefore an object of the present invention to provide a new and improved high pressure ball valve for use in oil field service to control the flow of high pressure water, oil or gas in pipelines.

Another object of the invention is in the provision of a new and improved seat for a high pressure ball valve which includes a core of polyethersulphone having elastomeric seals bonded thereto at high temperature.

A further object of the invention is to provide a seat for a ball valve having a ball engaging seal formed to resist "blowout" on opening and closing operation.

A still further object of the present invention is to provide a locking device for a ball valve capable of locking the valve in open or closed position.

Other objects, features and advantages of the invention will be apparent from the following detailed disclosure, taken in conjunction with the accompanying sheets of drawings, wherein like reference numerals refer to like parts, in which:

FIG. 2 is a top plan view of the ball valve of FIG. 1;

FIG. 4 is a vertical elevational view of a ball seat looking in the direction of the ball engaging face;

FIG. 5 is a sectional view taken through the seat substantially along line 5—5 of FIG. 4; and FIG. 6 is a greatly enlarged detailed sectional view taken through the seat substantially along line 6—6 of FIG. 4.

Figure 1:
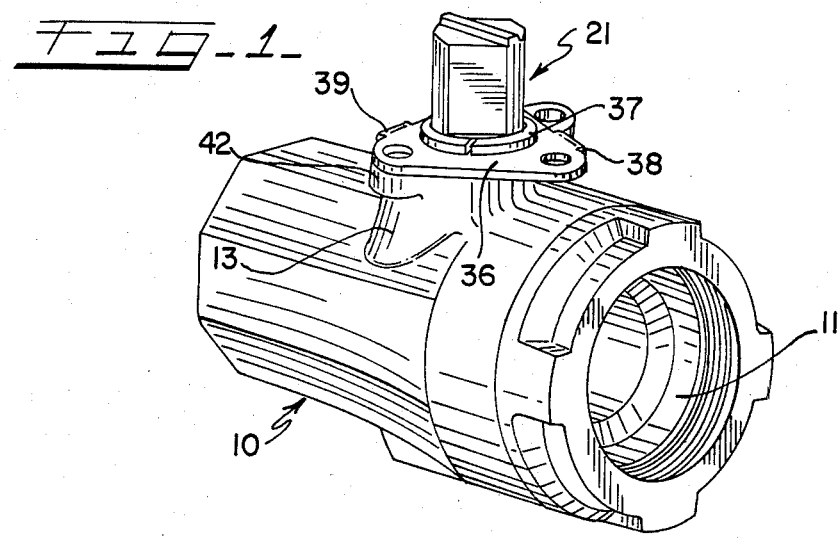
FIG. 1 is a perspective view of the ball valve according to the present invention.
Figure 3:
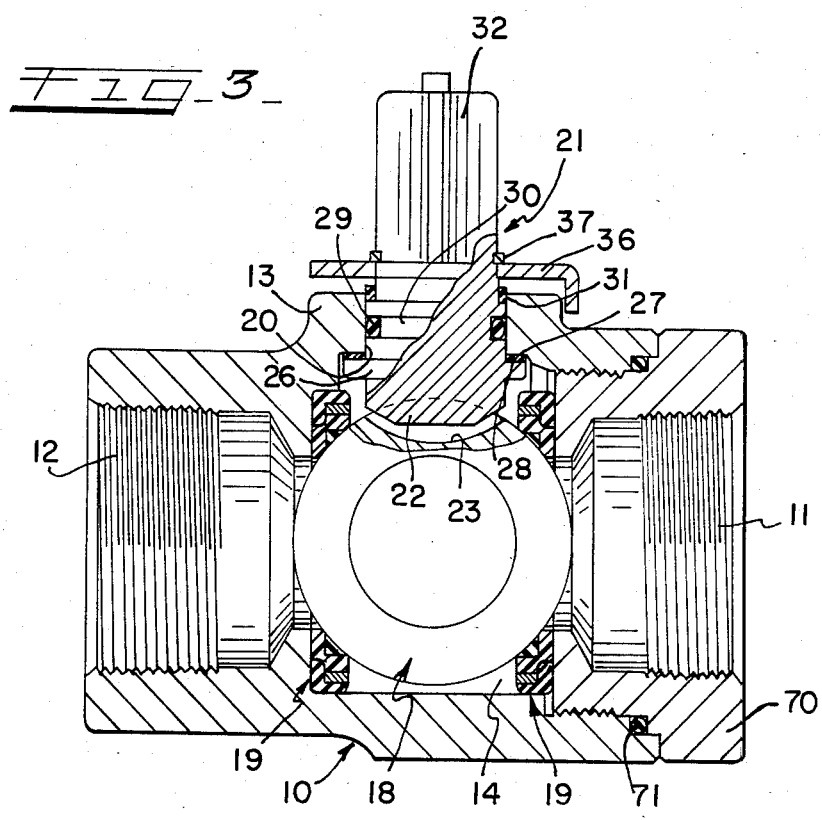
FIG. 3 is a vertical sectional view taken through the ball valve substantially along line 3—3 of FIG. 2.

Referring now to the drawings, and particularly to FIGS. 1 and 2, the ball valve of the present invention generally includes a valve body 10 having an inlet port 11, an outlet port 12 coaxially aligned with the inlet port, a bonnet 13 and a control chamber 14 disposed between the inlet and outlet ports. Preferably, the body is made of steel, although it could be made of any suitable material. It should be appreciated that fluid flow through the valve may be in either direction, thereby effectively defining the inlet and outlet ports at either end of the valve. Further, the ports would be suitably connected to piping. As illustrated, the ports include internal threads for connecting externally threaded piping although other types of connections could be utilized.

A ball or flow control element 18 is disposed in the flow control chamber between the inlet and outlet ports and guidably supported by a pair of opposed seats 19 aligned with the axis of the prots. The ball is made of a suitable metal and to be corrosion and erosion resistant. Within the bonnet 13 a stem bore 20 rotatably receives a stem 21 having a driving blade 22 at its lower end received in a driven slot 23 formed in the upper end of the ball 18. Sufficient clearance is provided between the driving blade and driven slot such that the ball floats between the seats 19.

The stem is provided with an annular flange 26 just above the blade 22 against which is disposed a thrust washer or bearing 27, preferably made of Teflon, which then in turn bears against a shoulder 28 formed at the lower end of the stem bore 20. An O-ring gasket 29 is received in an annular O-ring groove 30 on the stem to prevent leakage along the stem. A Teflon seal and bearing ring 31 is disposed on the stem against a shoulder and between the stem and the stem bore.

In order to rotate the ball 18 between open and closed positions, the upper end of the stem is formed at 32 for receiving a wrench. The position of the ball 18 is reflected by a combination indicator-lock assembly which includes a stop collar 36 retained on the upper end of the stem by means of a retainer ring 37. As seen particularly in FIGS. 1 and 2, the stop collar includes stop lugs 38 and 39 which coact with the bonnet 13 to stop the rotation of the stem and ball in either of two positions, i.e., open or closed, as shown by solid and dotted lines in FIG. 2, thereby indicating position. The stop collar is also provided with locking holes 40 and 41 which align with a hole formed in a bonnet flange 42 depending upon the position of the stop collar. When one of the locking holes on the stop collar is aligned with the locking hole on the bonnet locking flange 42, the hasp of a padlock may be inserted into the aligned holes and locked in place to prevent unathorized opening or closing of the valve.

The seat 19 of the invention is unique and provides a seal at the downstream end. Moreover, it is uniquely constructed in that it can withstand the high pressure forces encountered during cracking or opening of the valve and during closing of the valve. The seat 19 at the inlet end is held in place in alignment with the inlet port by the structure of the valve body wherein the outer periphery is received in a cylindrical counterbore. Similarly, the seat 19 at the outlet end is received in a cylindrical counterbore to hold it in alignment with the outlet port.

Each seat includes a core 50 molded of polyethersulphone, an annular metal reinforcing ring 51 concentric to the core, a face ball seal 52 and a rear body seal 53. The seals are of a suitable elastomeric resilient meterial, such as Nitrile rubber or neoprene, having a durometer of about 70. The face seal 52 is bonded to the spherical face 54 of the seat. The face 54 has the same radius as the ball closure element 18 to provide a mating fit between the surface of the ball and the face 54. The rear body seal 53 is essentially bonded to the circumference of the core 50 and the metal reinforcing ring 51, thereby also holding the metal reinforcing ring in position on the core. As above mentioned, the polyethersulphone core 50 is a moldable thermoplastic but moldable at a very high temperature, i.e., above 430 degrees F. Preferably, the polyethersulphone material is glass filled to enhance its strength. Following the molding of the core, the metal ring is disposed in position around the core and the elastomeric seals 52 and 53 are bonded to the core. Since the polyethersulphone core can withstand at least 400 degrees F. without distorting, the core can easily withstand the high temperature bonding of the elastomeric seals which is usually done at about 300 degrees F.

The rear seal 53 includes a pair of concentrically spaced convex in cross section ribs 58 and 59 forming concentrically arranged convex portions which bear against the body to prevent leakage between the body and the inner and outer edges of the seat. The convex ribs flatten when the seats are in assembled relation with the body and ball.

An annular recess 60 is formed in the ball engaging face 54 of the seat core and to which is bonded the face seal 52. The ball engaging face 54 on the core 50 is, as shown in FIGS. 5 and 6, broken up by the recesses 60, thereby defining spaced ball engaging face portions 54a and 54b. This seal includes a convex portion 61 and a concave portion 62. The area of the convex portion is greater than the area of the concave portion. As best seen in FIG. 6, the convex portion projects above the ball engaging face 54 or within the spherical volume defined by the face, while the concave portion 62 is disposed below the ball engaging face 54 or outside the spherical volume. Moreover, the concave portion 62 is disposed closer to the center of the seal for reasons that will be hereinafter explained.

Preferably, the seals 52 and 53 are made of Buna-N rubber or a selected nitrile which requires a high-bonding temperature for bonding it to the core. The durometer hardness is about 70. The Rockwell hardness of the polyethersulphone is M98. A plurality of circumferentially spaced axially extending ribs 65 are formed on the outer periphery of the seat and particularly on the back seal portion which assist in properly orienting the seats in the valve body.

It will be appreciated that the ball 18 floats in the housing in that it is not directly connected to a trunnion for effecting its rotation. Accordingly, it can seek its own position relative to the centers of the seats and shift uniformly and tightly against the downstream seat, thereby providing better sealing action.

In operation, considering the port 12 as being the outlet port and therefore that end of the valve as being the downstream end, when the valve is closed, the ball 18 will be pressured against the seat 19 which in turn is pressed against the seat pocket formed in the valve body. This tends to flatten the ribs 58 and 59 on the rear seal and also flatten the concave portion 61 of the face seal 52. This will effectively displace the seal material and somewhat fill up the concavity formed by the concave portion 62 to seal between the ball and the seat. On opening of the valve, the ball is rotated and the ball movement forces the interface between the ball and the seal 52 in the direction of movement which would be as looking at the seal 52 in FIG. 6 across the convex portion 61 and toward the concave portion 62. Inasmuch as when the ball is in sealed relation with the seat and the seal does not project above the seal face 54, the hypersonic fluid flow will not tend to blow out the seal. Opening of the valve will first cause the cracking of the valve between the ball face and the seal. Recognizing that the pressure of the fluid is extremely high, initial high volume stream will set up high and low pressure areas across the seal. The cracking intitiates hypersonic flow through the valve and across the seal face which generates turbulent forces. Because of the ratio of the area of the convex portion to the concave portion, such minimizes the shear on the face of the seal and prevents seal blowout. The strength of the core 50 enables the seat to withstand the opening and closing stresses in such a high pressure valve. The same forces present on opening will be generated during closing.

The valve of the present invention is of the end entry type. However, it can be appreciated that the seats of the present invention may be used in a top entry or center jointed valve. Thus, an end cap 70 is threadedly received by the valve body and sealed therewith by an O-ring gasket 71. Removal of the end cap 70 allows removal of the seats and the ball so that either of them may be replaced. During assembly the end cap initially compresses the seats 19. However, during operation it will be appreciated that the downstream seat will be compressed further by the upstream pressure which even disrupts the sealing action between the valve body, ball and seat such that the control chamber fills with the line fluid.

From the foregoing, it will be appreciated that the ball valve of the present invention may be economically manufactured and maintained and the seats may be made to provide longer life where used in such high-pressure installations.

It will be understood that modifications and variations may be effected without departing from the scope of the novel concepts of the present invention, but it is understood that this application is to be limited only by the scope of the appended claims.

The invention is hereby claimed as follows:

1. In a high pressure ball valve including a valve body having coaxially aligned inlet and outlet ports, a control chamber between said ports and a bonnet aligned with the control chamber, a ball in the closure chamber having a cylindrical passageway therethrough and rotatable between an open position where the passageway is coaxially aligned with said inlet and outlet ports and a closed position where the passageway is at right angles to the axis of the inlet and outlet ports, annular seats within said body and aligned with said inlet and outlet ports guidably supporting said ball, and a stem in the bonnet interconnected to said ball such that the ball floats between said seats, the improvement being in said seats each of which comprise a molded plastic core having a heat deflection point of at least 400 degrees F. and elastomeric sealing means bonded to said core to seal between the ball and body, said core having a spherical ball engaging face of the same radius as the ball with a recess intermediate the opposite edges of the face, said ball engaging face defining a spherical volume, said elastomeric sealing means including a seal in said recess to seal between the seat and ball, and said seal including a convex portion disposed within the spherical volume defined by said ball engaging face and a concave portion disposed outside the spherical volume defined by said face, said concave portion being disposed on the side of said convex portion toward the center of said seat.

2. The seats defined in claim 1, wherein the area across the convex portion of said seal is greater than the area across the concave portion.

3. The seats defined in claim 2 wherein said core is polyethersulfone.

4. The seats defined in claim 2, which further include a metal reinforcing ring circumferentially disposed to said core.

5. The seats defined in claim 1, which further include a second seal at the body engaging face of the seat to seal between the seat and the body.

6. The seats defined in claim 5, wherein said second seal includes a pair of concentrically arranged convex portions.

7. A high pressure ball valve for oil field service comprising, a valve body having coaxially aligned inlet and outlet ports, a control chamber between the ports and a bonnet aligned with the control chamber, a ball-shaped valve closure member in the control chamber having a cylindrical passageway therethrough and rotatable between an open position where the passageway is coaxially aligned with said ports and a closed position where the passageway is at right angles to the axis of said ports, a pair of annular closure member seats within said body one disposed between the closure member and the inlet port and the other disposed between the closure member and the outlet port, and a stem rotatable in said bonnet and interconnected to said ball such that the ball floats between the seats, each said seat including a molded core of polyethersulphone, a spherical ball engaging face of the same radius as the closure member and having a recess intermediate the opposite edges of the face, said ball engaging face defining a spherical volume, an elastomeric ball seal bonded to said recess for sealing between the ball and seat, said seal including a convex portion disposed within the spherical volume defined by the ball engaging face and a concave portion disposed outside the spherical volume defined by the ball engaging face, said concave portion being disposed on the side of said convex portion toward the center of said seat, a body engaging face opposite the ball engaging face, and an elastomeric rear seal bonded to the body engaging face for sealing between the seat and the body.

8. The high pressure ball valve defined in claim 7, wherein the area across the convex portion of the ball seal is greater than the area across the concave portion.

9. The high pressure ball valve defined in claim 8, wherein each said seat further includes a metal reinforcing ring circumferentially disposed to said core.

10. The high pressure ball valve defined in claim 7, wherein said rear seal includes a pair of concentrically arranged convex portions.

11. The high pressure ball valve defined in claim 7, wherein said valve further includes means for locking the stem and ball in the open and closed position, said means including a fixed locking flange on the bonnet with a locking hole, a locking plate fixed to the stem for rotation therewith and having a pair of locking holes one aligning with the locking flange hole when the valve closure member is in open position and the other aligning with the locking flange when the valve closure member is in closed position.

* * * * *